US008111618B2

(12) United States Patent
Li et al.

(10) Patent No.: US 8,111,618 B2
(45) Date of Patent: Feb. 7, 2012

(54) END-TO-END SERVICE QUALITY USING SOURCE-ROUTED PROBES

(75) Inventors: Fei Li, Piscataway, NJ (US); Marina K. Thottan, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1090 days.

(21) Appl. No.: 11/342,372

(22) Filed: Jan. 27, 2006

(65) Prior Publication Data

US 2007/0177518 A1  Aug. 2, 2007

(51) Int. Cl.
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/16 | (2006.01) |

(52) U.S. Cl. ............ 370/229; 370/230; 370/230.1; 370/231; 370/232; 370/233; 370/234

(58) Field of Classification Search .......... 370/229–235, 370/230.1, 235.1, 236, 236.1, 236.2, 237–253, 370/238.1, 241.1; 714/47
See application file for complete search history.

(56) References Cited

U.S. PATENT DOCUMENTS

| 2003/0112800 A1* | 6/2003 | Grech et al. ............... 370/389 |
| 2005/0081116 A1* | 4/2005 | Bejerano et al. ............ 714/47 |

FOREIGN PATENT DOCUMENTS

| GB | 2 400 266 A | 10/2004 |
| WO | WO 01/20430 A | 3/2001 |
| WO | WO 02/43324 A | 5/2002 |
| WO | PCT/US2007/001212 | 6/2007 |

OTHER PUBLICATIONS

Bejerano2, "Robust Monitoring of Link Delays and Faults in IP Networks", 2003, IEEE, all pages.*
Fei Li, "End-to-End Service Quality Measurement using Source-Routed Probes", Aug. 11, 2005, Columbia, all pages.*
Kumar, "Efficient Beacon Placement for Network Tomography", Oct. 25-27, 2004, ACM IMC '04, all pages.*
Breitbart, "Efficiently Monitoring Bandwidth and Latency in IP Networks".*
H.323, "Visual Telephone Systems and Equipment for Local Area Networks which provide a non-guaranteed Quality of Service", Nov. 1996, ITU-T, all pages.*

(Continued)

Primary Examiner — Kwang B Yao
Assistant Examiner — Adam Duda
(74) Attorney, Agent, or Firm — Wall & Tong, LLP

(57) ABSTRACT

The need to monitor real time network services has prompted service providers to use new measurement technologies, such as service-specific probes. A service-specific probe is an active probe that closely mimics the service traffic so that it receives the same treatment from the network as the actual service traffic. Service-specific probes are end-to-end and their deployment depends on solutions that address questions such as minimizing probe traffic, while still obtaining maximum coverage of all the links in the network. A polynomial-time probe-path computation algorithm is provided as well as a 2-approximate solution for merging probe paths when the number of probes exceeds a required bound k. The algorithms are evaluated using ISP topologies generated via Rocketfuel. For most topologies, it is possible to cover more than about 98% of the edges using just about 5% of the nodes as terminals.

18 Claims, 13 Drawing Sheets

OTHER PUBLICATIONS

M. Adler, T. Bu, R. Sitaraman, and D. Towsley, "Tree layout for internal network characterizations in multicast networks," in Proc. of NGC, London, UK, Nov. 2001.

D. Ahr and G. Reinel, "New heuristics and lower bounds for the Min-Max k-Chinese Postman Problem," in Proceedings of the 10th Annual European Symposium of Algorithms (ESA), Sep. 2002.

G. Ausiello, P. Crescenzi, G. Gambosi, V. Kann, A. Marchetti-Spaccamela, and M. Protasi, "Complexity and approximation," Springer, 1999.

Y. Bejerano and R. Rastogi, "Robust monitoring of link delays and faults in IP networks," in Proc of IEEE INFOCOM San Francisco, CA, USA., Mar. 2003.

Y. Breitbart, C. Y. Chong, M. Garofalakis, R. Rastogi, and A. Silberschatz, "Efficiently monitoring bandwidth and latency in IP networks," in Proc of IEEE INFOCOM Tel Aviv, Israel, Mar. 2000.

T. Bu, N. Duffield, F. Lo Presti, and D. Towsley, "Network tomography on general topologies," in Proc. ACM SIGMMETRICS, 2002.

G. Prabhakar, R. Rastogi, and M. Thottan, "OSS architecture and requirements for VoIP networks," Bell Labs Technical Journal, vol. 10, No. 1, 2005.

R. L. Carter and M. E. Crovella, "Measuring bottleneck link speed in packet switched networks," Performance Evaluation, vol. 27 & 28, pp. 297-318, 1996.

Y. Chen, D. Bindel, H. Song, and R. H. Katz, "An algebraic approach to practical and scalable overlay network monitoring," in Proc of ACM SIGCOMM Portland, Oregon, USA. Aug. 2004.

E. G. Coffman, M. R. Garey, and D. S. Johnson, "Approximation algorithms for bin packing: a survey, Approximation algorithms for NPhard problems," 1997.

C. Dovrolis, P. Ramanathan, and D. Moore, "What do packet dispersion techniques measure?," in Proc. IEEE INFOCOM, Anchorage, Alaska, USA, Apr. 2001.

A. B. Downey, "Using Pathchar to estimate Internet link characteristics," in Proc. ACM SIGCOMM, Cambridge, MA 1999.

W. Fernandez and G. S. Lueker, "Bin packing can be solved within 1+ in linear time," Combinatorica, 1981.

F. Francis, S. Jamin, V. Paxson, L. Zhang, D. F. Gryniewwicz, and Y. Jin, "An architecture for global Internet host distance estimate service," in Proc. of IEEE INFOCOM 1999, New York City, NY.

G. N. Frederickson, M. S. Hecht, and C. E. Kim, "Approximation algorithms for some routing problems," SIAM Journal of Computing, vol. 7, No. 2, May 1978.

R. L. Graham, "Bounds on certain multiprocessing anomalies," Bell System Technical Journals, 45:1563-1581, 1966.

D. S. Hochbaum and D. B. Shmoys, "Using dual approximation algorithms for scheduling problems: theoretical and practical results," Journal of the ACM, 34:144-162, 1987.

J. D. Horton and A. Lopez-Ortiz, "On the number of distributed measurements points for network tomography," in Proc. of Internet Measurement Conference, IMC 2003.

G. Iannaccone, C. Chuah, R. Mortier, S. Bhattacharyya, and C. Diot, "Analysis of link failures in an IP back bone," Internet Measurement Workshop, 2002.

V. Jacobson, "Congestion avoidance and control," in Proc. ACM IGCOMM, Stanford, CA, USA, 1988.

N. Karmakar and R. M. Karp, "An efficient approximation scheme for the one-dimensional bin packing problem," IEEE FOCS, 1982.

R. Kumar and J. Kaur, "Efficient beacon placement for network tomography," in Proc of Internet Measurement Conference, IMC 2004.

K. Lai and M. Baker, "Measuring link bandwidths using a deterministic model of packet delay," in Proc. ACM SIGCOMM, Stockholm, 2000.

M. J. Luckie, A. J. McGregor, and H. W. Braun, "Towards improving packet probing techniques," Internet Measurement Workshop, 2001.

R. Mahajan, N. Spring, D. Wetherell, and T. Anderson, "User-level Internet path diagnosis," in Proc of ACM SOSP, Bolton Landing, NY, USA. Oct. 2003.

V. N. Padmanabhan and D. R. Simon, "Secure traceroute to detect faulty or malicious routing," in Proc of HotNets-I Princeton, NJ, USA. Oct. 2002.

S. Parthasarathy, R. Rastogi, and M. Thottan, "Efficient design of end-to-end probes for source-routed network," Bell Labs Technical Memo. Apr. 2005.

A. Pasztor and D. Veitch, "Active probing using packet quartets," in Proc. Internet Measurement Conference, 2002.

A. Reddy, R. Govindan, and D. Estrin, "Fault isolation in multicast trees," in Proc. ACM SIGCOMM, 2000.

Y. Shavitt, X. Sun, A. Wool, and B. Yener, "Computing the unmeasured: an algebraic approach to Internet mapping," in Proc. IEEE INFOCOM 2000, Tel Aviv, Israel, Mar. 2000.

N. Spring, R. Mahajan, and D. Wetherall, "Measuring ISP topologies with rocket fuel," in Proc of ACM SIGCOMM 2002.

W. Stallings, "SNMP, SNMPv2, SNMPv3 and RMON 1 and 2," Addison-Wesley Longman Inc. 1999, (Third Edition), pp. 72-77.

Ling-Jyh et al.: "AdHoc Probe: Path Capacity Probing in Wireless Ad Hoc Networks" IEEE Computer Society, Jan. 1, 2005, pp. 1-8, XP002432310, http://ieeexplore.ieee.org/ie15/10095/32328/01509650.pdf?tp=&isnumber=&arnumber=1509 650 abstract; figures 2, and, 5 pp. 3-8.

* cited by examiner

| Algorithm 1 Link-covering for LCP $(G=(V,E))$ |
|---|
| Given a graph $G=(V,E)$;<br>Index all terminals;<br>The set of interesting edges is $S$;<br>for each edge $e := (v_l, v_r)$, $e \in S$ do<br>    for each terminal $t_i \in T$ do<br>        Find a shortest path $P_1 = v_l \rightsquigarrow t_i$ along with the indexed distance of a node;<br>        Chose the nearest terminal, ties broken in favor of the smaller indexed terminal;<br>        Remove all intermediate node $V'$ in $P_1$, between $v_l$ and $t_i$ from graph $G$;<br>        Remove all associated edges for node set $V'$;<br>        On the remaining graph $G = (V - V', E - E')$, find the shortest path $P_2 = v_r \rightsquigarrow t_j, t_j \in T$;<br>    end for<br>end for<br>Among all elementary paths or tours, choose the one with minimal total cost;<br>Denote it as probe $P_e$ for edge $e$;<br>Associate each node in $P_e$ with the difference between its shortest distance to $v_l$ and $v_r$ and the total cost of the edges it covers on that path;<br>Use associated distance as the shortest path calculation:<br>Remove all interesting edges $e'$, $S \leftarrow S - e', e' \in P_e$;<br>Mark $e$ and all removed edges as $Y$ to $P_e$;<br>if $f$ has been covered by other probes and $f \in P_e$ then<br>    Mark $f$ as $N$;<br>end if<br>for each probe $P_i \in P$ do<br>    if $\forall f \in P_i, f$ is marked $N, f \in S$ then<br>        Remove the heaviest probe $P_i$;<br>    end if<br>end for |

FIG. 4

Algorithm 2 Link-covering for PLP *(G=(V,E),k)*

Given a graph $G=(V,E)$, # of probes $\leq k$;
Apply Algorithm Link-covering for LCP;
if $k' \leq k$ then
    Return the maximal-cost $P_{max} \in P$;
else
    Calculate the *merge distance* for each pair of probes
    $P_i, P_j \in P$;
    while $k' > k$ do
        Merge $(P_i, P_j)$ with the minimal merge distance;
        $k' \leftarrow k'-1$;
    end while
end if

FIG. 5

Algorithm 3 Merge $(P_1, P_2)$ in Algorithm Link-covering for PLP $(G = (V,E),P)$
---
for ∀ shared edge $e \in P_1$ and $e \in P_2$ do
   if $e$ is shared by another probe $P$ then
      Link $P_1$ and $P_2$ at the connecting node $v$;
   else
      Return *false* for Merge $(P_1, P_2)$;
   end if
end for
if $P_1$ and $P_2$ have no shared edges between them then
   Link the *nearest node* between them;
   end if

FIG. 6

Algorithm 4 Link-covering for DLP $(G = (V, E), l_{max})$
---
Given a graph $G = (V, E)$, the maximal-cost of a probe $l_{max}$;
$k' = 1$; $l = \infty$;
while $l > l_{max}$ do
    $k' = 2 \times k$;
    Apply Link-covering for PLP $(G = (V, E), k')$;
    Get a probe set $P$ and the maximal-cost $l$;
    if $S$ is covered by $P$ (a reasonable solution) then
        Return $l$;
    else
        $l = \infty$;
    end if
end while

FIG. 7

| NAME | \|V\| | \|E\| | USED T (AS %) | COVERED E (AS %) | PROBE COST TOTAL | PROBE COST AVERAGE | PROBE COST MAXIMAL | # OF PROBES |
|---|---|---|---|---|---|---|---|---|
| TELESTRA (AUSTRALIA) | 351 | 784 | 17 (5%) | 392 (50%) | 934 | 3.98 | 8 | 235 |
|  |  |  |  | 769 (98.1%) | 1614 | 3.66 | 8 | 441 |
|  |  |  | 52 (15%) | 392 (50%) | 707 | 2.79 | 6 | 254 |
|  |  |  |  | 769 (98.1%) | 1305 | 2.67 | 6 | 489 |
| SPRINTLINK (US) | 604 | 2279 | 30 (5%) | 1139 (50%) | 3340 | 3.93 | 10 | 851 |
|  |  |  |  | 2277 (99.9%) | 6250 | 3.84 | 10 | 1627 |
|  |  |  | 90 (15%) | 1139 (50%) | 2550 | 2.85 | 6 | 894 |
|  |  |  |  | 2277 (99.9%) | 4883 | 2.80 | 8 | 1741 |
| VERIO (US) | 972 | 2839 | 48 (5%) | 1419 (50%) | 3824 | 3.96 | 11 | 966 |
|  |  |  |  | 2839 (100%) | 6937 | 3.97 | 11 | 1748 |
|  |  |  | 145 (15%) | 1419 (50%) | 3005 | 2.87 | 8 | 1048 |
|  |  |  |  | 2839 (100%) | 5445 | 2.774 | 8 | 1964 |
| LEVEL 3 (US) | 624 | 5301 | 31 (5%) | 2650 (50%) | 7592 | 3.23 | 11 | 2351 |
|  |  |  |  | 5301 (100%) | 15501 | 3.36 | 11 | 4662 |
|  |  |  | 93 (15%) | 2650 (50%) | 6584 | 2.76 | 8 | 2384 |
|  |  |  |  | 5301 (100%) | 13107 | 2.76 | 7 | 4756 |
| AT&T (US) | 631 | 2078 | 31 (5%) | 1039 (50%) | 3223 | 4.28 | 10 | 755 |
|  |  |  |  | 2078 (100%) | 5802 | 4.15 | 12 | 1300 |
|  |  |  | 94 (15%) | 1039 (50%) | 2457 | 3.00 | 8 | 820 |
|  |  |  |  | 2078 (100%) | 4534 | 2.97 | 7 | 1527 |

FIG. 8

| USED T (AS %) | COVERED E (AS %) | PROBE COST TOTAL | PROBE COST AVERAGE | PROBE COST MAXIMAL | # OF PROBES |
|---|---|---|---|---|---|
| 17 (5%) | 196 (25%) | 452 | 3.80 | 7 | 120 |
| | 392 (50%) | 934 | 3.98 | 8 | 235 |
| | 588 (75%) | 1381 | 4.15 | 9 | 334 |
| | 769 (98.1%) | 1614 | 3.66 | 8 | 441 |
| 38 (10%) | 196 (25%) | 416 | 3.12 | 6 | 134 |
| | 392 (50%) | 739 | 3.02 | 7 | 245 |
| | 588 (75%) | 1144 | 3.20 | 7 | 358 |
| | 769 (98.1%) | 1388 | 2.96 | 6 | 469 |
| 52 (15%) | 196 (25%) | 397 | 2.94 | 6 | 134 |
| | 392 (50%) | 704 | 2.78 | 6 | 255 |
| | 588 (75%) | 1037 | 2.76 | 6 | 375 |
| | 769 (98.1%) | 1326 | 2.72 | 6 | 487 |
| 88 (25%) | 196 (25%) | 325 | 2.23 | 4 | 146 |
| | 392 (50%) | 614 | 2.22 | 4 | 276 |
| | 588 (75%) | 885 | 2.20 | 4 | 403 |
| | 769 (98.1%) | 1148 | 2.18 | 4 | 527 |

| NAME | \|V\| | AVERAGE DEGREE | \|T\| | # PROBES BEFORE MERGE | # PROBES AFTER MERGE | MAXIMAL COST BEFORE MERGE | MAXIMAL COST AFTER MERGE | GAIN OF LCP (PERCENTAGE REDUCTION IN # OF PROBES) |
|---|---|---|---|---|---|---|---|---|
| TELESTRA (AUSTRALIA) | 351 | 2.336 | 52 | 485 | 211 | 6 | 8 | 56.5% |
| SPRINTLINK (US) | 604 | 3.77 | 90 | 1742 | 752 | 7 | 8 | 56.8% |
| VERIO (US) | 972 | 2.92 | 145 | 1964 | 863 | 8 | 8 | 56.0% |
| LEVEL 3 (US) | 625 | 8.41[1] | 93 | 4750 | 1963 | 7 | 10 | 58.7% |
| AT&T (US) | 631 | 3.29 | 94 | 1534 | 682 | 7 | 8 | 55.5% |

END-TO-END SERVICE QUALITY USING SOURCE-ROUTED PROBES

FIELD OF THE INVENTION

The present invention relates generally to the fields of networking and network management and, in particular, relates to monitoring network services and evaluating quality of service.

BACKGROUND OF THE INVENTION

Network probing with low overhead has prompted a flurry of research activity in recent past. A research project called the IDmaps project produced the latency maps of the Internet from which latencies of any arbitrary path can be obtained. However, because only relatively few paths are actually monitored, it is possible to make errors in estimating the latencies of any arbitrary path. An overlay network setting finds the minimal set of paths to monitor, so that the behavior of all paths can be inferred. One existing solution is to compute the minimum cost set of multicast trees that can cover links of particular interest in the network.

Recently, algorithms have been provided for selecting probe stations such that all links are covered and the minimal set of probe paths that must be transmitted by each station are computed, such that the latency of every link can be measured. However, the probe paths are computed via Internet protocol (IP) routes available from the probing stations. The problem of probe-path design has been considered where local flexibility was assumed. The probe-paths can be selected as either the current IP route or one of the current IP routes of the immediate neighbors. The efficient probe node (called beacon) placement strategy provides the minimum number of probe nodes required to deterministically monitor all network links even in the presence of dynamism in IP routes.

All of these existing works on probe-paths and probe-node location have focused on IP routes as potential probe-paths. There is a need to focus on explicitly routed probe packets. One work studied the problem of measuring path latencies through explicitly routed packet probes, while minimizing the overhead imposed by the probe traffic. However, the probe packets are required to originate from a central point in the network. There is a need for link-cover algorithms to focus on the design of probe paths. This differs from existing work, probe paths can be chosen (source-routed) that originate and terminate from any given set of terminal nodes in the network. This new problem setting raises the following questions: (1) how to define a probe, (2) how to find a minimum cost set of probes to cover a given set of edges, and (3) what is the tradeoff between the number of probes and the cost of probes?

SUMMARY

Various deficiencies of the prior art are addressed by various exemplary embodiments of the present invention of systems and methods for end-to-end service quality using source-routed probes.

One embodiment is a method for network monitoring. After receiving a topology of a network, a set of selected edges, and a set of terminals, a set of probes is determined that has probe paths that originate and terminate from the set of terminal nodes. These probe paths cover the set of selected edges, while minimizing cost. This method provides the set of probes, which is capable of measuring an end-to-end service quality. Another embodiment is a computer readable medium storing instructions for performing this method. Another embodiment is a system for network monitoring, including a processor and a software component. The processor includes an operating system and at least one storage device. The software component executes on the processor and performs this method.

BRIEF DESCRIPTION OF THE DRAWINGS

The teachings of the present invention can be readily understood by considering the following detailed description in conjunction with the accompanying drawings, in which:

FIG. 4 is a listing of pseudo code for an exemplary embodiment of an algorithm describing how to find the set of probes with the minimal total cost of probes;

FIG. 5 is a listing of pseudo code for an exemplary embodiment of the algorithm for primal link-covering problem (PLP);

FIG. 6 is a listing of pseudo code for an exemplary embodiment of a method for merging in the algorithm link-covering for PLP;

FIG. 7 is a listing of pseudo code for an exemplary embodiment of a method for link-covering for dual link-covering problem (DLP);

FIG. 8 is Table I, which shows simulation results of the exemplary embodiment of the polynomial-time algorithm for minimum-cost link-covering problem (LCP) on different Internet service provider (ISP) topologies;

FIG. 9 is Table II, which shows simulation results of the exemplary embodiment of the polynomial-time algorithm for minimum-cost link-covering problem (LCP) for the Telestra topologies;

FIG. 10 is Table III, which shows simulation results of the exemplary embodiment of the 2-approximation PLP algorithm;

DETAILED DESCRIPTION OF THE INVENTION

Figure 1:
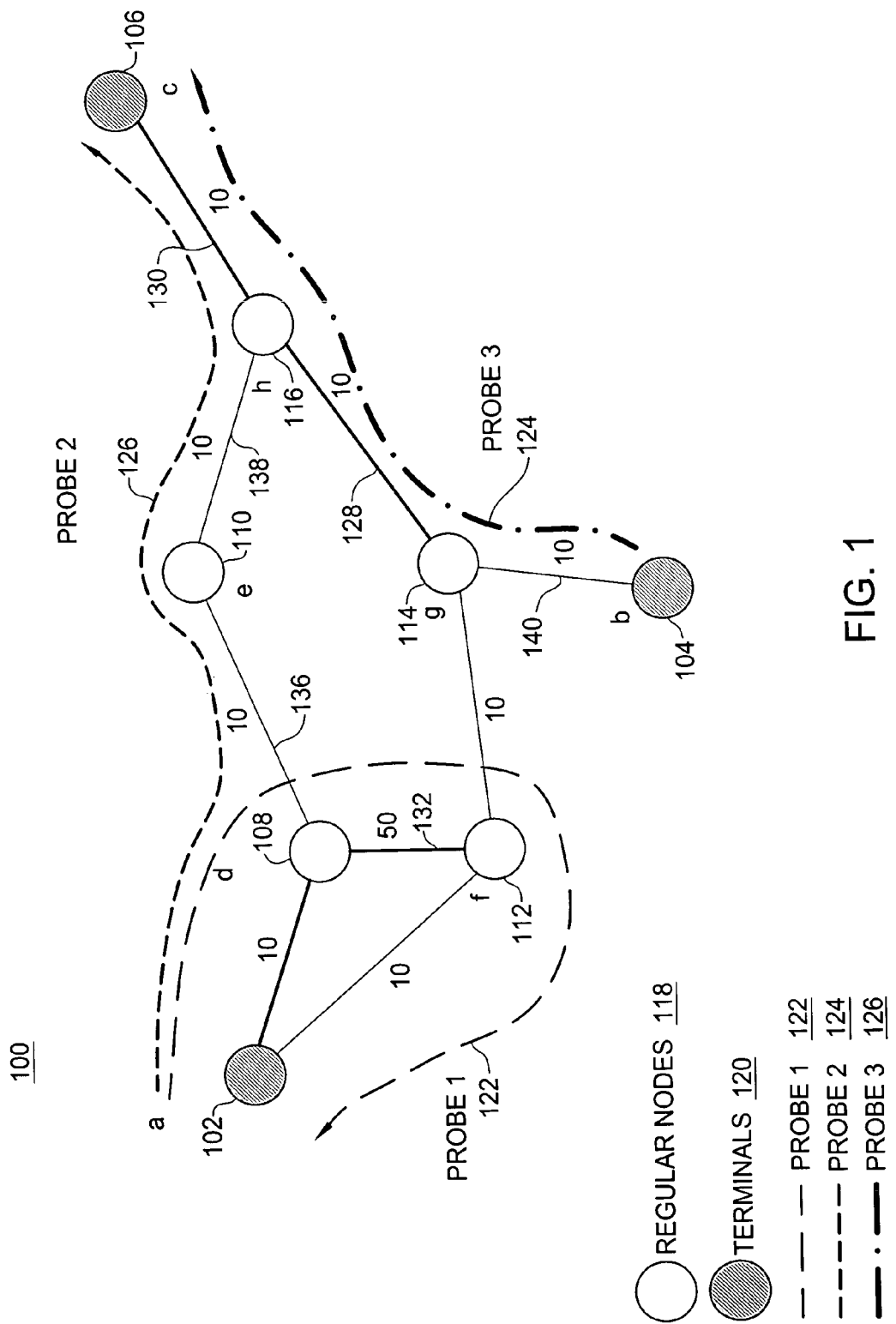
FIG. 1 is a block diagram of an example showing the link-cover problem.

The present invention will be primarily described within the general context of exemplary embodiments include systems and methods for end-to-end service quality using source-routed probes. However, those skilled in the art and informed by the teachings herein will realize that the invention is applicable generally to any network, any network protocol, and any kind of probes. Edges and links are used synonymously in the following description.

INTRODUCTION

The emerging need to support real-time services and applications over a converged Internet Protocol (IP) network has prompted service providers to monitor network-wide service performance and service availability. In addition to having sufficient capacity to support the required throughput, service performance also depends on the impairments due to routing, such as reconvergence times and service disruption duration. Thus, the performance and availability of a network service depends not only on available bandwidth, but also on router architectures and the design of the control plane. Evaluating the impact of network impairments on services can best be performed by end-to-end probes, which can mimic the behavior of the specific service being monitored. These end-to-end probes can track the changes of crucial performance parameters, such as network delay and loss. End-to-end probes fall in the general category of active probes.

Current measurement methods, i.e., those based on the standard simple network management protocol (SNMP)-based polling or link-level measurements, cannot be used to model network services. SNMP only provides a device centric view of performance, while link-state metrics such as those based on Hello packets can only be used to detect link failures/availability. Unlike employing end-to-end probes, neither of these methods can be used directly to measure end-to-end delay, loss, and the impact that these performance metrics have on service quality. There are many issues surrounding the deployment of end-to-end network probes. One exemplary embodiment is a design for optimal probe deployment algorithms to detect service quality degradation over the IP path provisioned for the specific service. For example, voice over IP (VoIP) probes are designed to monitor the stringent end-to-end delay and loss requirements.

There are different types of end-to-end probe mechanisms: one-packet methods such as pathchar, the packet pair family, IP management protocol (IPMP), and Internet control message protocol (ICMP). Pathchar is used for estimating link bandwidths via round trip delays of packet sequences from successive routers. Packetpair methods can be used for estimating available bandwidth or the bottleneck link rate. Using these 2 techniques to obtain end-to-end measurements requires that the measured data be correlated with the topology information obtained from traceroute.

IPMP is used for measuring one-way delay and is designed to overcome some of the limitations of the packet probes. The IPMP protocol combines both path and delay measurements, thus alleviating the need for correlation with the traceroute measurement (i.e., path information is determined from the path record field in the IPMP packet, which is populated by the routers). In a user-based path diagnosis method that overcomes the limitations of pathchar, two end-users of a flow cooperate to find performance faults that affect their flow. The users do not make use of any privileged network information, but make use of packet pair techniques such as ICMP. However, the treatment received by probe packets, such as IPMP and ICMP at the individual routers, is dependent on the protocol used to encapsulate the probe packet. The network may prioritize this probe traffic differently from normal service traffic.

Thus, any active measurement method that is out-of-band (not end-to-end) and does not look like application traffic might experience different network conditions as compared to the service traffic. Therefore, it cannot be used to measure service quality. An example of an out-of-band network measurement scheme is one that identifies faulty and malicious routing. In that scheme, the goal was to securely trace the path of existing traffic, thus preventing malicious routers from misleading specialized traceroute packets by treating them differently from normal traffic.

One exemplary embodiment is a service monitoring framework that comprises sourcerouted probes crafted to mimic different network services (e.g., VoIP and Video-on-Demand). Using the complete knowledge of network topology, a service provider can efficiently choose the MPLS probe paths that cover a set of interested edges, thus reducing the total probe traffic. This is called the link-covering problem. Service specific probes are sent along the computed probe paths at some predefined frequency, and checked for violations in terms of end-to-delay or loss metrics. Based on the probe paths that experienced performance degradation, a miscreant-link detection algorithm can be initiated on the common set of links to isolate the link that is contributing to the performance degradation. Source-routed probes provide a deterministic map between the probe measurements and the associated links. Thus the correlation problem can be avoided with inaccurate trace route data (due to transient congestions), as well as the limitation of pathrecord fields in IPMP.

This framework assumes that, in general, most links have good operational performance and one goal is to identify the few links or nodes that may be encountering performance degradations. This approach may significantly reduce the total probing load on the network. One embodiment of the end-to-end probe design assumes complete knowledge of the topology and requires network support for source-routing mechanisms such as MPLS.

Two main issues related to deploying active network probes are simultaneously addressed by exemplary embodiments: (1) reducing the amount of probe traffic and (2) minimizing the cost of deploying probes. The cost of probe deployments can be captured in terms of terminal costs (e.g., installing software for creating a probe terminal) as well as the path costs (i.e., capacity cost of using a specific link).

A link-cover problem is formulated as a combinatorial graph problem, where a set of probes are designed that can cover a specified set of edges of interest and every probe is elementary (i.e., without traversing intermediate nodes more than once). The design of our minimal total cost probe-paths is obtained using a greedy approach. This is a polynomial-time algorithm and is based on the idea of getting the minimal-cost source-destination path for each edge to be covered. The algorithm generates probes without loops and results in a set of probes with the minimal total cost. Two variants of the link-cover problem are considered. One variant is to minimize the maximal-cost of any probe, while keeping the total number of probes be $\leq k$. The other variant is to minimize the number of probes, while keeping the maximal-cost of any probe be $\leq l_{max}$. These two variants are NP-hard and exemplary embodiments include 2-approximation algorithms for them.

Exemplary embodiments include a polynomial-time algorithm as well as the 2-approximation algorithms, which were evaluated via the simulations on five of the largest Internet service provider (ISP) topologies obtained from the research project called the Rocketfuel project. The evaluation criteria in each case were: (1) the total cost of all probes, (2) the maximal cost of a probe, when the total number of probes is fixed, and (3) the average cost of a probe.

It was shown that the exemplary embodiments of the algorithms performed extremely closely to the optimal solution, when the probe terminal set was chosen to be the backbone nodes. A probe terminal is the node that a probe starts from and at which it ends. Probes have been designed to be those paths (tours) derived from a Chinese Postman Tour covering all edges of a graph as known to one skilled in the art. However, the probes deployed in that solution had loops, which made the solution more tedious requiring a loop detection scheme and the use of heuristics to eliminate the loops. The elimination of loops is a needed step for a practical implementation of the probes. One exemplary embodiment is a method that explicitly accounts for the elimination of loops by finding probes that are elementary paths (tours) only, i.e., the probe path never intersects a transit (intermediate) node more than once.

Motivation and Problem Formulation

Real-time monitoring of network performance and service availability requires measurement techniques to measure end-to-end delay, packet loss, and service quality. Service-specific probes are active probes that closely mimic the service traffic such that they receive the same treatment from the network as the actual service traffic, in one embodiment. Source-routed probes also mimic different network services, in one embodiment. Source-routed probes require complete knowledge of the network topology. Combined with a miscreant-link detection algorithm, links contributing to performance degradation can be isolated. Source-routed probes avoid the correlation problem. Network support is available for source-routing, such as multiprotocol label switching (MPLS). Evaluating network service quality can be performed by end-to-end probes, in one embodiment.

There is a need for an algorithm for minimizing total probe traffic, for minimizing the maximal-cost of a probe, and minimizing the number of probes. Simulation results for exemplary embodiments indicated that for most ISP topologies, just 5% of the nodes as terminals covered more than 98% of the edges; therefore, increasing the number of terminals does not help much in minimizing the total probe traffic.

Problem Description

FIG. 1 is a block diagram 100 of an example showing the link-cover problem. In the network shown in FIG. 1, there are 8 nodes: node a 102, node b 104, node c 106, node d 108, node e 110, node f 112, node g 114, and node h 116. Node a 102, node b 104, and node c 106 act as the terminal nodes (shaded circles in FIG. 1) 118 and all others (i.e., node d 108, node e 110, node f 112, node g 114, and node h 116) are regular nodes (unshaded circles in FIG. 1) 120. The dashed lines in FIG. 1 are the probe paths. There are three probes: probe 1 122, probe 2 124, and probe 3 126. Each probe 122, 124, 126 locates its end-points at one of the terminals 118, i.e., node a 102, node b 104, or node c 106. Each network link has a cost (weight) as specified in FIG. 1. Edges (g, h) 128, (h, c) 130, (a, d) 132, and (d, f) 134 are the network links of interest. (The terms edge and link are used interchangeably herein.) A goal is to design a set of probes that covers all these interesting edges, i.e., the selected edges to monitor.

In this example, probe 1 122 goes from terminal a 102, traverses links (a, d) 132, (d, f) 134, and reaches back to terminal a 102; probe 2 124 goes from node a 102, traverses links (a, d) 132, (d, e) 136, (e, h) 138 and arrives at terminal c 106. Probe 1 122 is a tour. Probe 3 124 starts from terminal b 104, runs across edges (b, g) 140, (g, h) 128 and ends at terminal c 106. All links of interest 128, 130, 132, 134 are covered by these 3 probes. The sum of the weights of all edges of a path is used to represent the cost of a probe. The total cost of the set of probes is (10+50+10)+(10+10+10+10)+(10+10+10)=140, and the maximum cost probe is probe 1 122, whose cost is 70. From this example, link (a, d) 134 is covered by two probes (i.e., probe 1 122 and probe 2 126), and its weight counts twice to the total cost of these three probes. A probe 122, 124, 126 is allowed to have both its ends lie at the same terminal, like probe 1 122. Also, probe 2 126 is unnecessary to cover all interesting edges 128, 130, 132, 134. That is, probe 2 126 can be removed and all interesting edges 128, 130, 132, 134 are still covered by probe 1 122 and probe 3 126 only, and the total cost is reduced to 100 from 140.

Problem Formulation

One exemplary embodiment is a formal description of the link-cover problem. The network is modeled as a connected, undirected graph, $G=(V, E)$, V is the set of the vertices (which represents the nodes in the network), and E is the set of edges (which represent the network links); $|V|=n$ and $|E|=m$. There is no self-loop in G, i.e., there is no edge that goes from one node and returns to the node itself, and G is not necessarily a planar graph. Without confusion, in graph G, node and vertex, link and edge are used interchangeably.

There is a cost function over each edge $e \in E$, $w_e \rightarrow \mathbb{R}^+$. This function denotes the cost of a probe when it runs across this network link (edge). A set of specific nodes T in the graph are called terminals, $T \subset V$. S is the set of edges of interest and $S \subset E$. Normally, $T \neq \emptyset (1 \leq |T| \leq n)$ and $S \neq \emptyset$. A path P is defined to be a set of concatenated edges between two nodes in V and these two nodes are called ends of the path. If both ends of a path are the same node, the path can also be called a tour. Given a path P, we use $e \in P$ to denote the fact that path P contains (runs across) edge e. Except for end-nodes, all nodes that a path crosses are called intermediate nodes. In the general case, a path may have loops. A loop is defined to be a sub-path that crosses an intermediate node more than once. A path (resp. tour) not traversing any intermediate node more than once is called an elementary path (resp. tour); that is, an elementary path (resp. tour) is loop-less. Also, the path from node $v_1 \in V$ to node $v_2 \in V$ is denoted as $v_1 \leadsto v_2$ and the cost of a path P is defined as $w(P) := \Sigma_{e \in P} w_e$.

A specific path called probe is defined to be an elementary path from one terminal $t_1 \in T$ to another terminal $t_2 \in T$. That is, both ends of a probe must be terminals. Terminals $t_1$ and $t_2$ are not required to be distinct. If $t_1 = t_2$, the probe is a (loop-less) tour. The motivation for enforcing a probe to be elementary is that, typically, a route with loops is not permitted in an IP network. Such a path will be rejected by the routers. Therefore, a feasible solution to the link-cover problem is to find a set of elementary probe-paths, P, such that every edge $e \in S(\subset E)$ is covered by at least one path $P \in P$.

Input Instance

Given an undirected, connected weighted graph $G=(V, E)$, $S \subset E$ and $T \subset V$. A mapping $w_e$ exists, from each edge $e \in E$ to a non-negative number representing its cost, $w_e: w_e \rightarrow \mathbb{R}^+$; for each edge $e \in E$, $w_e \geq 0$. The set of probe-paths, P, is defined as all such probes ($P = v_i \leadsto v_j$), $v_i, v_j \in T$. For each edge $e \in S$, there exists at least one probe $P \in P$, such that $e \in P$. Exemplary embodiments have optimization objectives that can be represented as the following three subproblems: minimum-cost link-covering problem (LCP), primal link-covering problem (PLP), and dual link-covering problem (DLP).

1. The first subproblem is the minimum-cost link-covering problem (LCP). In LCP, the goal is to minimize the total cost of the probes required. The cost of the probes is measured in terms of the traffic load on the network. That is, min $\Sigma_{P \in P} w(P)$,
subject to:
$\forall e \in S, \exists P_j, \in P, e \in P_j$,
$\forall P_i \in P, P_i$ has no loop.

2. The second subproblem is primal link-covering problem (PLP). In PLP, the goal is to minimize the maximum cost of a probe. The cost of a probe can be measured in terms of latency, throughput, or length. That is, min $\max_{P \in P} w(P)$
where $|P| \leq k$,
subject to:
$\forall e \in S, \exists P_j \in P, e \in P_j$
$\forall P_i \in P, P_i$ has no loop.

where k is a constant and is the upper bound of the number of probes that can be used.

3. The third subproblem is dual link-covering problem (DLP). In DLP, the goal is to minimize the total number of probes. The total number of probes reflects the cost of probe installation. That is, min k
where $|P| \leq k$,
subject to:
$\forall P \in P, w(P) \leq I_{max}$,
$\forall e \in S, \exists P_j \in P, e \in P_j$,
$\forall P_i \in P \; P_i$ has no loop.

where $I_{max}$ is the given maximal cost allowed for any probe and k is the number of probes required.

Algorithms and Analysis

The complexity of the three variants of the link-cover problem needs to be determined. Because LCP is not a NP-hard problem, a polynomial-time algorithm that is designed for LCP and a 2-approximation algorithm for PLP and DLP are presented. The complexity (hardness) for PLP and DLP is analyzed as follows.

Complexity Analysis for Relaxations of PLP and DLP

In the problem formulation, a probe is enforced to be an elementary path or tour. Even if the problem formulation is relaxed, such that a probe is not necessarily an elementary path (can have loops), PLP and DLP are still NP-hard. This can be easily generalized from the Min-Max k-Chinese Postman Problem (MM k-CPP) and the Capacitated Arc Routing Problem (CARP).

Briefly speaking, PLP is the generalization of MM k-CPP when S=E and T={s}, where s is the depot node in MM k-CPP. At the same time, DLP is the generalization of CARP when we let S=E and T={s}, where s is the depot node and $I_{max}$ is the vehicle capacity in CARP.

NP-Hardness of the Primal Link-Cover Problem (PLP)

If a probe is restricted to be defined as an elementary path (tour), PLP's hardness cannot be induced directly from the MM k-CPP.

Consider the following problem, i.e., minimal makespan scheduling. Given a set of tasks, T, there are m identical machines for fixed number m. Each task t∈T requires time $p_t$ to be finished and any task can be run on any (identical) machine. The objective of this problem is to minimize the makespan, which is the maximal completion time for any machine in this schedule. This problem, minimizing makespan scheduling, is known to be NP-hard (even for m=2) and there exists a simple greedy policy, which results in a 2-approximation algorithm. Also, a polynomial-time scheme (PTAS) algorithm improves the approximation ratio to be 1+ε. The following proves that PLP's hardness via a transformation from the problem of minimizing makespan scheduling.

Theorem 1: The decision version of PLP is NP-hard

Proof: Theorem 1 is proved by the contradiction method via a transformation from the problem of minimizing makespan scheduling. Given any instance I of the minimum makespan scheduling problem, prove that an instance I' can be constructed to PLP (in polynomial-time), such that if I' satisfies PLP in polynomial-time, then I satisfies the decision version of the minimum makespan scheduling problem in polynomial-time. Therefore, assume there exists a polynomial-time algorithm for PLP; then, the problem of minimizing makespan over multiple machines is not NP-hard, because it can be solved via the algorithm for PLP in polynomial-time. Details of the proof follow.

Consider an instance I of the minimum makespan scheduling problem. There are m identical machines and a set of jobs T. Each job t∈T requires processing time of $p_t$. Now, construct an instance I' to PLP. In I', there is a graph G= (V,E), |V|=2×|T|+2. Each job t∈T corresponds to two nodes in graph G and, without loss of generality, each job is viewed as one that has a left node and a right node in the graph. The weight of the edge connecting the left node and the right node is $p_t$.

Suppose there are two specific nodes, $s_1$ and $s_2$. T={$s_1,s_2$}. Now, link $s_1$ to each job's left node and set the weight of the link to be 0. Also, link each job's right node to $s_2$ and the weight assigned to that link is 0. Furthermore, link each job's right node to all other job's left nodes and assign the weight of the link to 0. The corresponding edges (connecting a job's left node and right node) of all jobs consist of the set of interesting edges $S \subset E$. Until now, an instance I' to PLP was created in which only two terminals, $s_1$ and $s_2$ exist. Set S to the set of edges to cover and the number of probes to be used, k, is limited by m(k≤m), where m is the number of identical machines in instance I to the minimum makespan scheduling problem.

Clearly, for this instance, I', if a polynomial-tie algorithm can be constructed that minimizes the maximal cost of a probe, then, given the existence of k=m probes (the more probes used, the smaller the probe length), it can be seen in the instance I that all the edges belonging to the same probe lead to all corresponding jobs scheduled on one machine. There are m-k machines to run these jobs. So, any instance to the minimum makespan scheduling problem can be converted in polynomial-time to an instance to PLP. Because the decision version of the minimum makespan scheduling problem is NP-hard, the decision version of PLP is NP-hard. Theorem 1 holds.

Next, consider the NP-hardness of DLP. DLP is the counterpart of PLP and they have the same NP-hardness. Similarly, the hardness of DLP cannot be proved via a direct transformation from CARP. Consider a classical NP-hard problem, the bin-packing problem. Given n items with sizes $a_1, a_2, \ldots, a_n \in \{0,1\}$, find a packing in unit-sized bins that minimizes the number of bins used. The bin-packing problem has been proved to be NP-hard. From that, corollary 1 is inferred.

Corollary 1: The decision version of DLP is NP-hard

Proof: Corollary 1 can be proved via a transformation from the classical problem of bin-packing, which is the same as that constructed in the proof to Theorem 1, except that the weight of the edges to cover corresponds to the value of an item in the bin-packing problem.

Clearly, for this instance, I', a polynomial-time algorithm can be constructed that minimizes the number of the probes. Then, given the existence of each probe cost $\leq I_{max}$ it can be seen that in the instance I, the number of probes reflects the number of bins to be used. So, any instance to the bin=packing problem can be converted in polynomial-time to an instance to DLP. Because the decision version of the bin-packing problem is NP-hard, the decision version of DLP is NP-hard also. Corollary 1 holds.

Given the fact that PLP and DLP are NP-hard, there is no efficient algorithm solving them. So, an approximation algorithm is designed to solve them, in one embodiment. Some previously well-known results are useful in understanding the algorithms. First, finding a Chinese Postman Tour in a mixed graph is NP-hard. However, there exists an efficient algorithm to calculate a Chinese Postman Tour in an undirected graph. Second, there is an efficient algorithm for calculating the shortest-path between any two nodes in an undirected, connected and non-negative weighted graph. If the weight of an edge is allowed to be negative, the shortest path problem is NP-hard. Third, there is an efficient algorithm for breadth-first search or depth-first search. Using the breadth-first search algorithm, a simpler shortest path algorithm can be found (in linear time) on un-weighted, undirected graphs. Based on the second and third techniques, a polynomial-time algorithm can be designed for LCP and a 2-approximation algorithm can be designed for both PLP and DLP.

Algorithms

One exemplary embodiment is a polynomial algorithm that can compute a set of elementary probes P, such that all edges in S are covered by at least one path P∈P and the total cost of the probes is minimized. Another exemplary embodiment is a 2-approximation algorithm for PLP. One embodiment, with a little modification on the algorithm for PLP, is a 2-approximation algorithm for DLP.

Without loss of generality, use $t_1, \ldots, t_{|T|}$ to denote the set of terminals and use (a, b) to denote the edge connecting node a and node b. Node a is the left node for the edge and node b is the right node for the edge. Remember that, in undirected graphs, there is no difference between left node and right node of an edge. Here, "left" and "right" are specified for easiness of illustrating the algorithms only. In the following, a shortest path refers to the shortest path on a weighted, undirected graph. The shortest path refers to the probe (path) with minimal cost.

A Polynomial-Time Algorithm for LCP

Lemma 1: Given an edge $e=(v_1,v_2)$, a set of terminals T, the shortest path from one terminal to the nodes $v_1$ and $v_2$, say $t_i\leadsto\to(v_1,v_2)\leadsto\to t_j$ is either an elementary path (tour) or a path (tour) that has only one loop. Here, $t_i,t_j\in T$ and $t_i$, and $t_j$ are not necessarily distinct.

Proof: The shortest path stated (found) in Lemma 1 may not be a probe, though both its ends are terminals, because a probe is required to be only an elementary path (tour). The proof to Lemma 1 is straightforward. Given a path $t_i\leadsto\to(v_1, v_2)\leadsto\to t_j$, first, there are no other terminals in between $t_i\leadsto\to v_1$, $(v_1,v_2)$, and $v_2\leadsto\to t_j$. Otherwise, the given path is not a shortest path from the node of the given edge $(v_1,v_2)$ to a terminal in T. The reason is that the shortest path algorithm is applied (on a non-negative, weighted graph) in locating the terminal for $v_1$, so once a terminal is met for $v_1$, any possible terminal along the path has shorter distance to $v_1$.

If both nodes of the edge e, $v_1$ and $v_2$, have one same terminal as their destination of the shortest paths, exactly one loop is generated. Lemma 1 holds.

Lemma 1 serves the purpose of finding the shortest probe that covers only one edge. Given an edge $e=(v_1,v_2)(e\in S)$ and given the set of terminals $T\subset V, |T|\leq n$, there are at most $|T|^2$ pairs of terminals that can serve as the probe-ends for a probe covering edge, e. Also, if the shortest path to $v_1$ is given by, say $P_1=t_i\leadsto\to v_1$, in order to avoid generating a loop, other than $t_i\in T$, any intermediate node in the path $v\in P_1(v\ne t_i)$—none of them is a terminal—cannot be one of the intermediate nodes in the path from $v_2$ to a terminal, $v_2\leadsto\to t_j$. Therefore, once the shortest path from one terminal to $v_1$ is found, to avoid generating loops, all the intermediate nodes V' in the path need to be removed and all the edges E associated with those intermediate nodes need to be removed from the graph $G'=(V-V', E-E')$, where V' is the set of intermediate nodes in the shortest path from one terminal to $v_1$ and E' is the set of edges associated with those nodes. Apply the same procedure to find a shortest path $P_2$ from $v_2$ to another terminal $\in T$. Clearly, if such a path exists, $P_1\leadsto\to P_2$, it is an elementary path (tour).

Care needs to be taken in the order of picking $v_1$ and $v_2$. Without loss of generality, index all terminals and if node $v_1$ has the same distance to more than one terminal in T, select the one that has a smaller index number. With such an approach, the procedure for locating the nearest terminal for a given node is fixed in polynomial-time. Also, if $P_2$ cannot be found, then there is no elementary path (tour) containing the edge e.

Now, given $|T|^2$ pairs of terminals, at most $|T|^2$ different elementary paths (tours) covering each edge $e\in S$ can be found. Then, among those $|T|^2$ elementary paths calculated, determine which one is the shortest one covering the edge $e=(v_1,v_2)$. Select it as the shortest elementary path that is assigned to e. Therefore, followed by Lemma 1, we have Lemma 2.

Lemma 2: Given an edge $e=(v_1,v_2)$, a set of terminals T, there exists a polynomial-time algorithm to find the shortest (minimum-cost) and elementary path from $t_i\leadsto\to(v_1,v_2)\leadsto\to t_j,t_i,t_j\in T$ and $t_i$, and $t_j$ are not necessarily distinct.

Proof: Given a terminal $t_i\in T$, there exists a polynomial-time algorithm to find the minimal-cost path from $v_1$ to $t_i$. Then, remove all intermediate nodes in the path and their associated edges from the remaining graph. Apply the same algorithm to get the minimal-cost path from $v_2$ to a terminal $t_j\in T$. In conclusion, the concatenated path (tour) (a path fro a terminal to $v_1$, edge e, and a path from $v_2$ to a terminal) is elementary. Among all feasible concatenated paths or tours (at most $|T^2|$) paths or tours, because both $v_1$ and $v_2$ can be the first node in finding a path in the procedure), the minimal-cost one can be found and it serves as the probe covering edge $(v_1,v_2)$.

It is claimed that any shorter (less cost) path or tour that covers edge $(v_1,v_2)$ results in a loop. Assume a shorter path exists, say an optimal path. It has three parts; without loss of generality, assume it consists of a path from one terminal to $v_1$, edge 2, and a path from $v_2$ to one terminal. So, the optimal path from one terminal to $v_1$ is the same as the one found. With the same distance to different terminals, the node chosen is the one with the smallest indexed number.

Figure 3:
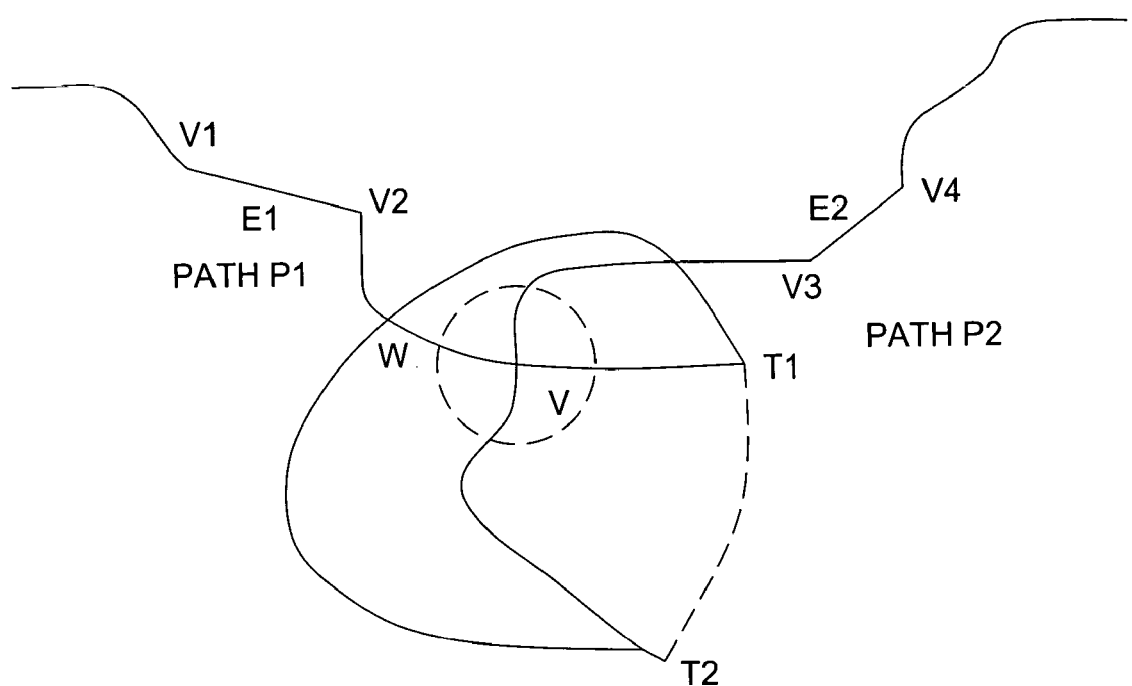
FIG. 3 is an illustration of an example for the proof to Lemma 2.

FIG. 3 is an example 300 illustrating the proof to Lemma 2.

Assume there are two edges to cover, i.e., $e_1=(v_1,v_2)$ and $e_2=(v_3,v_4)$. Two elementary paths cover them and one path covering $e_1$ starts from terminal $t_1$ and ends at terminal $t_2$. The other path covering $e_2$ starts from terminal $t_3$ and ends at terminal $t_4$. Assume these two paths intersect at node v. Now, consider the path covering $e_1$, when it goes from node v, it chooses terminal $t_2$ instead of terminal $t_4$ as its end, because the path length from v to $t_4$ is larger than the path length from v to $t_2$. At the same time, the path covering $e_2$ chooses $t_4$ instead of $t_2$ as its terminal, so the path length from v to $t_4$ is shorter than that of the path from v to $t_2$. These two conclusions conflict with each other. Thus, the assumption is wrong. So, any two elementary paths calculated from the shortest-distance algorithm cannot intersect with each other.

In summary, if there exists a shorter path from $v_2$ to one terminal, then the path should interact intersect with one intermediate node in the path to $v_1$. Therefore, it turns out that the path is not elementary. If path $P_1$ and $P_2$ share an edge, they must share at least one node. From the above analysis, Lemma 2 holds.

Theorem 2 follows from Lemma 1 and Lemma 2.

Theorem 2: There is a polynomial-time algorithm for finding a set of probes P, such that all interesting edges are covered by the probes P such that all interesting edges are covered by the probes and $\Sigma_{P\in P}w(P)$ is minimized.

Proof: Theorem 2 is proved by a construction method directly from Lemma 1 and Lemma 2. Lemma 1 and Lemma 2 provide a polynomial-time procedure to find an elementary path (tour) covering any given edge e. Lemmas 1 and 2 provide the background for finding the minimal total-cost probes covering all edges in S. The minimal-cost path from one node to a given terminal is calculated using any shortest-path algorithm over an undirected, non-negative weighted graph. Once a probe for edge e is located, all interesting edges in this probe are removed from S. Among those paths with interesting edges on it that are also covered by other probes, remove that probe from P. Repeat this until there is no such probe in the set P. This removes the redundancy of the probes covering all required edges. The greedy approach. reduces the total cost of the probes in each step and each newly generated probe cannot be replaced by all proves generated already. So, apply the same procedure to find the shortest path covering the remaining edges in S. Repeat until set S is empty.

Then, a set of elementary paths P is found. P is a path that acts as a probe, covering one or more interesting edges. Finally, the above procedure results in a polynomial-time algorithm for LCP in minimizing the total cost of all proves. Theorem 2 holds.

Figure 2:
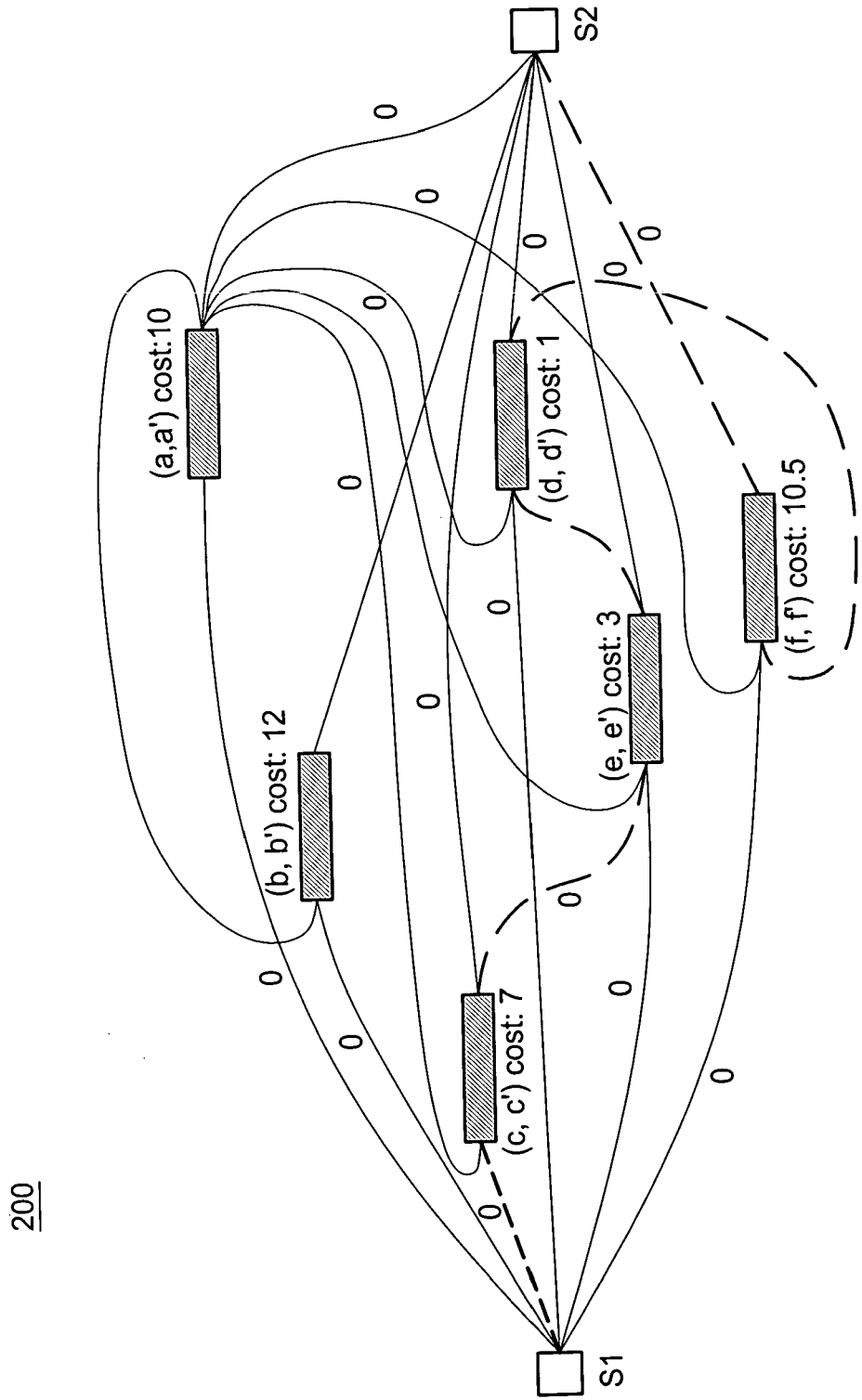
FIG. 2 is an illustration of an example for the proof of Theorem 2.

Refer to FIG. 2 as an example to the proof of Theorem 2. (Not all links are shown in FIG. 2 for clarity.) Given five edges to be covered, $s_1$ and $s_2$ are only two terminals in T. The costs of traversing each edge are shown as those in FIG. 2. Now, assume the number of probes is limited to be k=2 and two probes, i.e., $s_1 \to 10 \to 12 \to s_2$ and $s_1 \to 7 \to 3 \to 1 \to 10.5 \to s_2$, are found in a polynomial-time algorithm for PLP, with the minimum cost of a probe being 22. So, correspondingly, in the minimum makespan scheduling problem, these five jobs can be optimally arranged in two identical machines. One is running jobs with processing time 10, 12 and the other is running jobs with processing time 7, 3, 1, and 10.5. The optimal makespan is 22.

FIG. 4 is a listing of pseudo code for an exemplary embodiment of an algorithm describing how to find the set of probes with the minimal total cost of probes. This exemplary embodiment is an algorithm to find a link-covering for LCP for a graph, G, having a set of vertices, V, and a set of edges, E. The input includes the topology of the network, G=(V,E), a set of interesting edges, $S_0$, and a set of terminal nodes, T, which are indexed. For each interesting edge between any two given nodes I and r ($v_I, v_r$) and for each terminal that belongs to the set of terminals, find a shortest path between node I and the terminal. Choose the nearest terminal, breaking any ties in favor of the smaller indexed terminal. Find another path from terminal node back to either the same terminal node or some other node without using the links that were already used. So, all the intermediate nodes, V', in the original shortest path are removed from the graph G and all associated edges are removed as well. Then, on the remaining graph, G, find another shortest path from the next endpoint, $v_r$, to a terminal node, which could be the same or a different terminal node. In this way, break down the link ($v_I, v_r$) as if it were two shortest path problems going from any terminal node to $v_I$ and, then, $v_r$ to any other terminal node, making sure that the path from $v_r$ to any other terminal node does not use any links used in the past to avoid loops.

Once all the elementary paths for each given edge are found, choose the elementary path with the minimum total cost and denote it as probe $P_e$ for edge e. Remove all interesting edges e' from $S_0$. Mark e and put removed edges into a separate set. The second part of the problem is to remove the probes having the heaviest weights, e.g., high cost or number of hops. Sometimes longer probe paths are more costly than shorter probe paths. The first part of the problem is finding loop-free paths and finding a set of probes that cover the interesting edges for the least cost. The result of this exemplary embodiment is a set of probe paths that cover the interesting edges and have the minimum cost. This set of probe paths is capable of being used in a network monitoring tool, such as NetProbe. A network manager can send probes from one terminal to another using the set of probe paths. This configures probes to send traffic over a network that mimics a network service at minimum cost.

A 2-Approximation Algorithm for PLP

The proof of Theorem 2 is a constructive proof. Assume the number of elementary shortest paths found is k'. If the number of probes for all edges in S, k'≦k, the optimal solution is found to PLP, which is the maximal-cost of the probe in the prove-sets found. If k'>k, the number of probes is reduced by merging some of them, until the number of elementary paths (tours) is k. In order to merge two elementary paths, under a bounded cost for the maximal-cost probe, two elementary paths (probes) can be merged into one elementary path (probe).

The following definitions help illustrate exemplary embodiments of algorithms clearly and efficiently. Briefly, for the exemplary embodiment of the approximation algorithm for PLP, first, a series of elementary probes is found, as done in the algorithm for LCP. Then, if the number of probes k' is more than what is affordable, say k'>k, merge probes such that the number of probes is reduced, while sacrificing the maximal-cost of a probe in the probe set. The following definitions are related to the exemplary embodiment of merging two probes.

Definition 1: Merge distance is the minimal cost of the final probe after connecting two proves via linking one node in one probe to another node in the other probe.

Clearly, there exists an efficient algorithm (polynomial-time) to identify the cost of linking two probes. Not every pair of probes can be merged into one longer probe.

Definition 2: A shared edge is an edge e that is said to be shared by all the probes that are incident to it, if several probes (≧2 probes) cross an interesting edge e∈S to cover. If an edge only has one probe to cover it, that edge is necessary to that probe.

Clearly, given any two probes, the probes can be linked together, while leaving (possible) shared edges aside. Lemma 3 is based on these definitions.

Lemma 3: Given any two elementary paths (tours), there exists a method that concatenates these two elementary paths and still finds an elementary path. Other terminals may exist on the path, because such a path may be concatenated by several elementary paths covering a given edge.

Proof: Lemma 3 can be proved by the contradiction method. For each elementary path, the left or right node of an edge has the minimum-cost to the nearest terminals in the elementary path found. If two elementary paths, $P_1$ and $P_2$ have a node v that both of them traverse, conclude that for the given node v in these two paths, there are two terminals that both have minimal-cost. FIG. 4 illustrates an example of this proof of Lemma 3.

Both path $P_1$ and path $P_2$ share the same node v. Edge $e_1$ is the edge that $P_1$ supposes to cover and $e_2$ is the edge that $P_2$ supposes to cover. The end terminals for $P_1$ and $P_2$ are $t_1 \in T$ and $t_2 \in T$. Now, investigate the paths from v to $t_1$ and from v to $t_2$. Because, when the probe $P_1$ for edge $e_1$ is located, $P_1$ will end at terminal $t_2$ based on the order of the terminals and the distance of the terminals examined. In the same manner, after analyzing the path $P_2$, it is concluded that length(v$\leadsto t_1$)> length(v$\leadsto t_2$). This conclusion conflicts with the conclusion made before. Therefore, the elementary paths $P_1$ and $P_2$ do not traverse the same node.

Furthermore, $t_1$ and $t_2$ can be linked to generate an elementary path for both paths, if there is no shared intermediate node (or no shared edges) in path $P_1$ and path $P_2$ (as illustrated in FIG. 2). If path $P_1$ and path $P_2$ have shared edges, there is no way to reduce the number of probes via removing $P_1$ or $P_2$ only. (For any probe, all of whose interesting edges are shared and have been removed from the probe set P as algorithm link-covering for LCP does.) Based on the above analysis, Lemma 3 holds.

One exemplary embodiment is an approximation algorithm for PLP. Let L denote the maximum-cost of a probe path in a graph G=(V,E) under the restriction that there are at most k probe paths (the solution). Use OPT to denote an optimal solution for the min $w(P)_{P \in P}$. The number of probes is $\leq k$, and A returns the maximum length of a probe.

First, it is known before merging and probes together, after the algorithm link-covering for LCP, a series of elementary paths (tours) are found as the probes for the interesting edges. Assume the number is k'. If $k' \leq k$, return the optimal maximal-cost of a probe. If k'>k, merge elementary paths in order to reduce the number of probes, while the maximal-cost of the probes is the lower bound of OPT. The merge part is similar to the bin-packing problem, if the probe-length is regarded as the bin's load and the number of probes is limited as the number of bins, k. With the goal of reducing the complexity of the algorithm, apply the optimal suit method to merge any two probes. If their probe distance is the smallest among all pairs of probes, these two elementary paths are merged, if possible. This exemplary embodiment of the algorithm for PLP is shown in FIG. 5.

FIG. 5 is a listing of pseudo code for an exemplary embodiment of the algorithm for primal link-covering problem (PLP). This exemplary embodiment has an input graph G, representing the topology of a network, and a limit, k, on the number of probes, i.e., the number of probes must be less than k. Unlike the exemplary embodiment in FIG. 4 for link-covering for LCP, this exemplary embodiment finds a set of probes covering a set of interesting edges using a minimum number of probes. In FIG. 4 the number of probes was unlimited so long as the total cost was minimized. Here, in FIG. 5, the number of probes is also minimized.

The exemplary embodiment of FIG. 5 first calls the exemplary embodiment of FIG. 4 to find the link-covering for LCP and if the number of probes is less than k, then that set of probes is provided. Otherwise, the exemplary embodiment for PLP of FIG. 5, merges pairs of probes (see FIG. 6) until the number of probes is less than k.

FIG. 6 is an exemplary embodiment of a method for merging in the algorithm link-covering for PLP. In this exemplary embodiment, the procedure for merging two elementary probes is called Merge($P_1$, $P_2$). The nearest nodes are defined to be the node pairs $v_1 \in P_1$ and $v_2 \in P_2$. Linking these two nodes makes the final probe connecting $P_1$ and $P_2$ the minimal newly generated probe cost. In FIG. 6, for all shared edges, e, LCP provided two paths, $P_1$ and $P_2$. If e is shared by another probe P, then link $P_1$ and $P_2$ at the connecting node. Otherwise, paths $P_1$ and $P_2$ cannot be merged. If $P_1$ and $P_2$ have no shared edge between them, then link the nearest node between them.

Minimizing the number of probes also minimizes the number of terminals. It is desirable to have as few terminal nodes as possible. This is because terminal nodes require extra enhancement of the nodes, including extra software, extra computing capacity, extra storage, and the like. Specialized nodes, like terminal nodes, are most expensive than regular nodes in a network.

Theorem 3: The algorithm link-covering for PLP is 2-approximation.

Proof: Theorem 3 states a fact that the algorithm link-covering for PLP works the same way as the optimal suit algorithm for bin-packing, if the number of probes is regarded as the number of bins and the maximal-cost of a probe is regarded as the maximal-load of a bin. Directly following the bin-packing algorithm's analysis, Theorem 3 can be proved. The detailed proof is as follows.

OPT is used to denote the optimal maximal-cost of a probe, instead of the optimal algorithm itself. The lower bound of OPT corresponds to a set of k probes, such that each interesting edge e∈S is covered by at least one probe and the maximal-cost of a probe in such probe set is minimized to be OPT. In each step, merge two elementary paths. The increase of the cost of the probe is bounded by OPT as the minimal merge distance is chosen. Also, the sum of the total cost of the covered edges to the nearest terminal is the lower bound of k×OPT and the cost of each probe to be merged is also the lower bound of OPT. So, in each step, the cost of any probe generated is still bounded by 2×OPT. Therefore, Theorem 3 holds.

A 2-Approximation Algorithm for DLP

One exemplary embodiment of a 2-approximation algorithm is introduced for DLP. The variant DLP is the counterpart of the variant PLP.

Assume the maximal cost of a probe is limited by $I_{max}$. The goal is to minimize the number of probes to be employed. First of all, with a fixed initial number k'=1 as the number of probes used, apply the algorithm link-covering for PLP to estimate the maximal length of a probe generated. If the maximal cost of a probe is $I_p$ in the resulting probe set P and if $I_p \leq I_{max}$, it is claimed that k' is the minimal number of probes to be used. If $I_p > I_{max}$, double k'. Increase k' by one time, k'←2×k' and, then, apply the same algorithm for PLP to locate a set of probes and the maximal cost of a probe in it. Repeat until there is a set of probes P in which the maximal-cost of probe $\leq I_{max}$ and return k'. It is claimed that k'$\leq$2×k, which is proven in Theorem 4.

FIG. 7 is an exemplary embodiment of a method for link-covering for DLP. This exemplary embodiment minimizes the maximal cost of any probe in the set of probes covering the interesting edges, S. Inputs include a limit on the maximal cost of a probe so that no probe in the probe set should have a cost that exceeds that limit. Given the probe set, P, if the maximal cost of a probe is greater than the limit, find another probe set by calling PLP (see FIG. 5) with k'=2×k, until the maximal cost of all of the probes in the probe set P are less than the limit.

Using Theorem 3 and following the same idea, yields Theorem 4.

Theorem 4: The algorithm link-covering for DLP is 2-approximation.

Proof: Theorem 4 can be proved by following Theorem 3 directly. From Theorem 3, it is known that if the number of proves used is increased by one time, then the algorithm link-covering for PLP returns the lower bound of the optimal maximal-cost of a probe, when the optimal algorithm has k probes to be used and the algorithm is allowed to employ 233 k probes. So, in algorithm link-covering for DLP, in the step $I \leq I_{max}$, the number of probes increases up to two times the number of probes that an optimal algorithm will use. Therefore, Theorem 4 holds.

Simulation Results

The link-cover solutions were evaluated on different realistic ISP topologies that were obtained from the Rocketfuel project. The largest five topologies were chosen, because they provide the most interesting analysis in terms of the complexity of the network being monitored. Each link in the network is assigned a cost that is its inferred latency (link cost). In each case, the backbone nodes were chosen as the potential set of terminals.

Because the number of terminals (backbone nodes) for the ISP topologies is relatively large when compared with the total number of nodes (almost half), the choice of the number of terminals was restricted to be about 5%, 10%, and 15% of the total number of nodes |V| of that topology. However, the chosen terminals were placed at randomly chosen backbone node locations. Also, the set of interested edges to be covered was chosen to be about 25%, 50%, 75%, and 100% of the total number of edges in the network.

Table I, which is shown in FIG. 8, shows the results of the exemplary embodiment of the polynomial-time algorithm for LCP on different ISP topologies. The algorithm is used to compute the number of probes required to cover the interested edges using about 5% and 15% of the total nodes as terminals. Two sets of interested edges comprising about 50% and 100% of the total edges were considered. In each case, the maximal-cost of a probe, the average-cost of a probe, and the total cost of all of the probes were obtained. One scenario was where, for the Telestra and Sprintlink networks, not all edges randomly selected could have been covered by a probe, because the probe was required to be an elementary path linking two terminals. The specific question of the impact of the number of probe terminals on coverage was studied using the Telestra topology and the results are presented in Table II, which is shown in FIG. 9.

The general case of the undirected, non-negative, weighted graphs were considered. So, the cost of the edge cost for probe traversal was assigned as a non-negative real number. Without loss of generality and for simplicity in experimental design, the number of hops was used to denote the cost of the path. That is, the shortest path on an unweighted graph was calculated.

From Tables I and II, it was seen that, as expected, the number of probes almost doubled as the number of interested edges increased from about 50% to 100% of all the edges in the network. A similar effect was observed in the total probe costs. Covering additional edges with the same number of terminals increased as the total probes cost increased. Also observed was that the maximal cost and the average cost of the probe decreased as the number of terminals increased. Furthermore, the values of these metrics were found to be comparable for all five topologies.

The evaluation of the 2-approximation PLP algorithm was presented in Table III, which is shown in FIG. 10. Here, the fixed k was targeted as the ½ of the number of probes obtained using LCP. Table III provided as comparison of probe characteristics (e.g., probe cost, maximal-cost, average cost of a probe) obtained by the polynomial algorithm LCP and the probes obtained after merging using the PLP algorithm.

DISCUSSION

One goal was to design optimal probe paths to cover the selected edges in a network. The optimality criteria was evaluated using metrics such as the total cost of the probes deployed, maximal cost of the probe, and the number of probes required to cover the edges. Under these evaluation metrics, it was found that the LCP algorithm provided a very good performance.

With only about 5% of the nodes as terminals, almost 100% of the edges were covered. Increasing the number of terminals to about 15% did not provide any additional edge coverage and reduced the total cost of the probes on average by only about 1.08%. It was found that using fewer terminal nodes implied that fewer nodes needed to be enhanced to host probe generation software and probe installation costs were minimized.

Using about 5% of the nodes as terminals and about 100% coverage of links, the average cost of a probe was found to be 3.62, suggesting that the load induced by probing on the different network links was minimal. One goal of the PLP algorithm was to reduce the number of probes by merging the probe paths obtained using LCP. It was found that, after merging, the average percentage reduction in the number of probes was just about 26%. This implied that the probe paths identified by the LCP algorithm were close to optimal.

From Table III, for any given topology, there was no linear relationship between the number of terminals and the total number of probes or probe costs. It was believed that this effect was a consequence of the shortest path computation used to determine probe paths as well as some experimental factors involved with the random choice of the interested edges.

Figure 11:
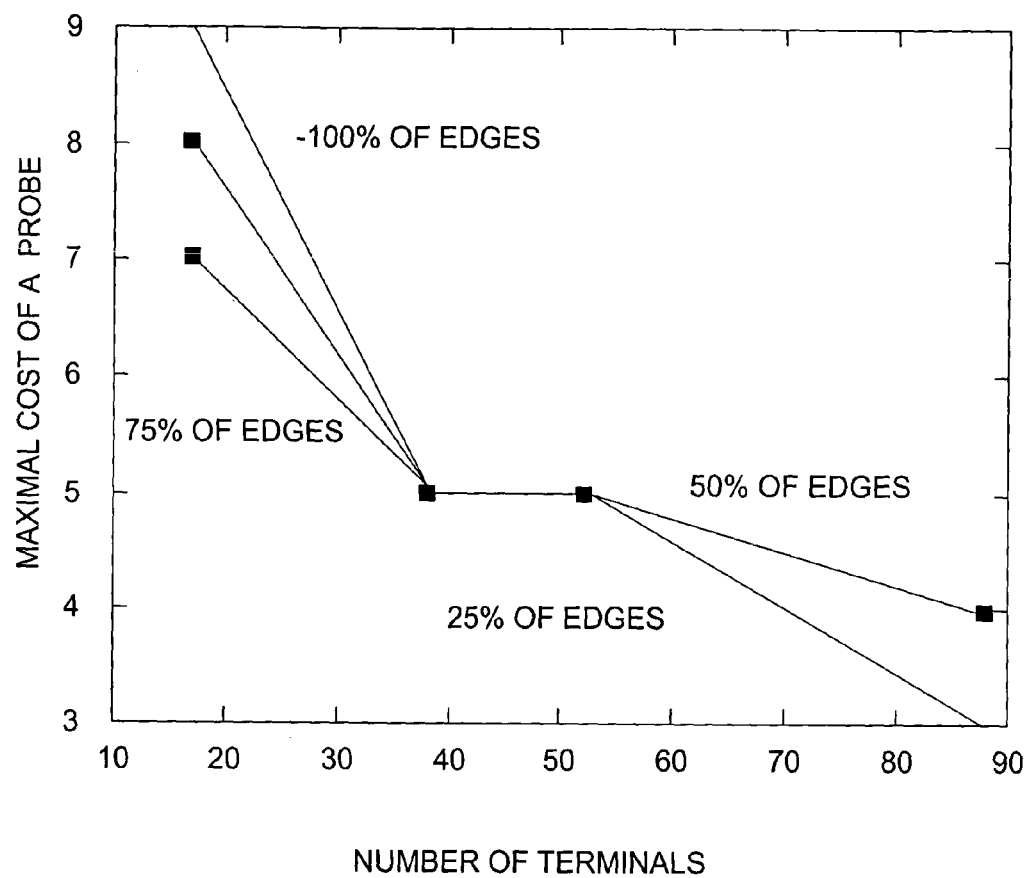
FIG. 11 is a chart showing an exemplary relationship between the maximal costs of a probe and the number of terminals in the Telestra topology.

FIG. 11 shows an exemplary relationship between the maximal costs of a probe and the number of terminals in the Telestra topology. It was observed that, as the number of terminals increased, the maximum probe cost decreased. However, only unit gain was obtained by increasing the number of terminals from about 15% of the nodes as terminals. Thus, it was claimed that for the topologies considered, the gain expected by solving the dual problem of PLP, namely DLP, might not have been significant. Thus, an exemplary embodiment of the two step design for probe based monitoring includes the LCP algorithm followed by PLP.

Impact from Network Topology

Figure 12:
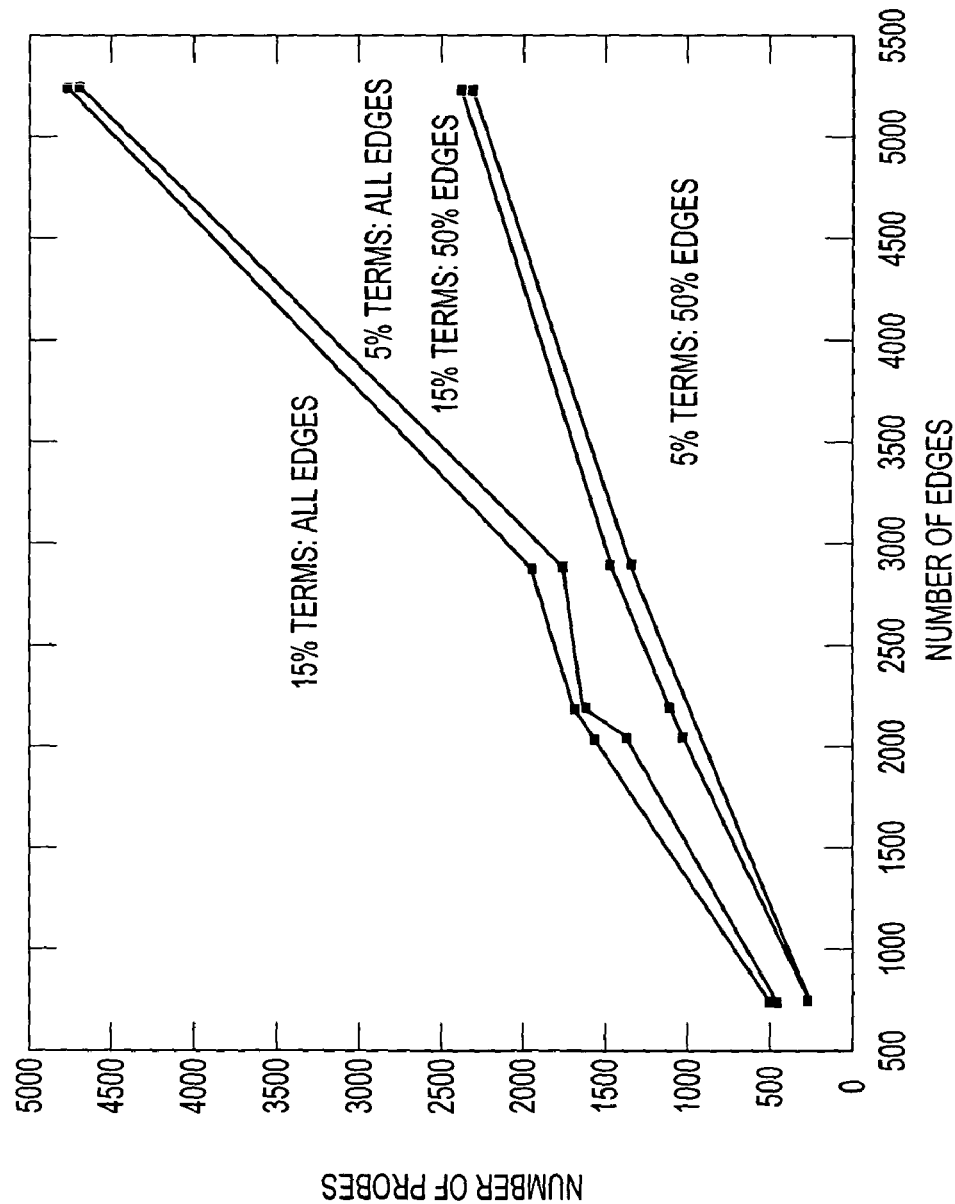
FIG. 12 is a chart showing the total number of edges in the network versus the total number of probes in exemplary simulations.

From FIG. 12, it was found that the number of probes required to cover the interesting edge set was almost linearly dependent on the number of edges in the network. The observation was found to be true, regardless of the number of interested edge or the number of terminals used. However, from Table I, it could be seen that the number of nodes did not have any characterizable impact on the number of probes. It was also observed that in the case of covering all edges, in two of the five topologies, increasing the number of terminals did not improve the edge coverage. The same number of links was left uncovered in both cases. It was believed that this was a consequence of the location of these edges in the network with respect to the position of the (randomly) chosen terminal nodes.

It was also observed that the percent reduction obtained using PLP in the number of probes and the maximal cost of the probe was dependent on the degree of the network. It was found that for the network with the highest degree of about 8.41, the reduction after PLP was significantly smaller than the other four topologies, which had an average degree in the range of about 2.336 to 3.29. Thus, for networks with higher degree, the exemplary embodiment of the polynomial-time LCP algorithm provided a nearly optimal solution.

CONCLUSION

Based on the simulations studied, it was concluded that for any network topology, for covering almost 100% edges, only about 5% of the nodes needed to be assigned as terminal nodes. This was a significant finding for probe-based monitoring systems. Because there was no edge coverage advantage by adding additional probe terminals, the design of the probe-based monitoring system can be optimized strictly based on deployment costs. The deployment costs are in terms of the cost of terminal installations versus the cost of setting up and maintaining probe paths. Furthermore, using the exemplary embodiment of the LCP algorithm, it is possible to obtain probe paths that provide nearly optimal results in terms of minimizing all three criteria: the number of probes, the maximal cost of the probe, and the average probe cost.

One embodiment uses the DLP algorithm taking into account topological issues, such as the degree of network connectivity for further improvement of the PLP algorithm. The exemplary embodiments of the PLP and DLP algorithms can be easily mapped on to the minimum makespan scheduling problem and bin-packing problem. Therefore, it is believed that a (1+ϵ)-approximation algorithm exists, when k is a constant.

Figure 13:
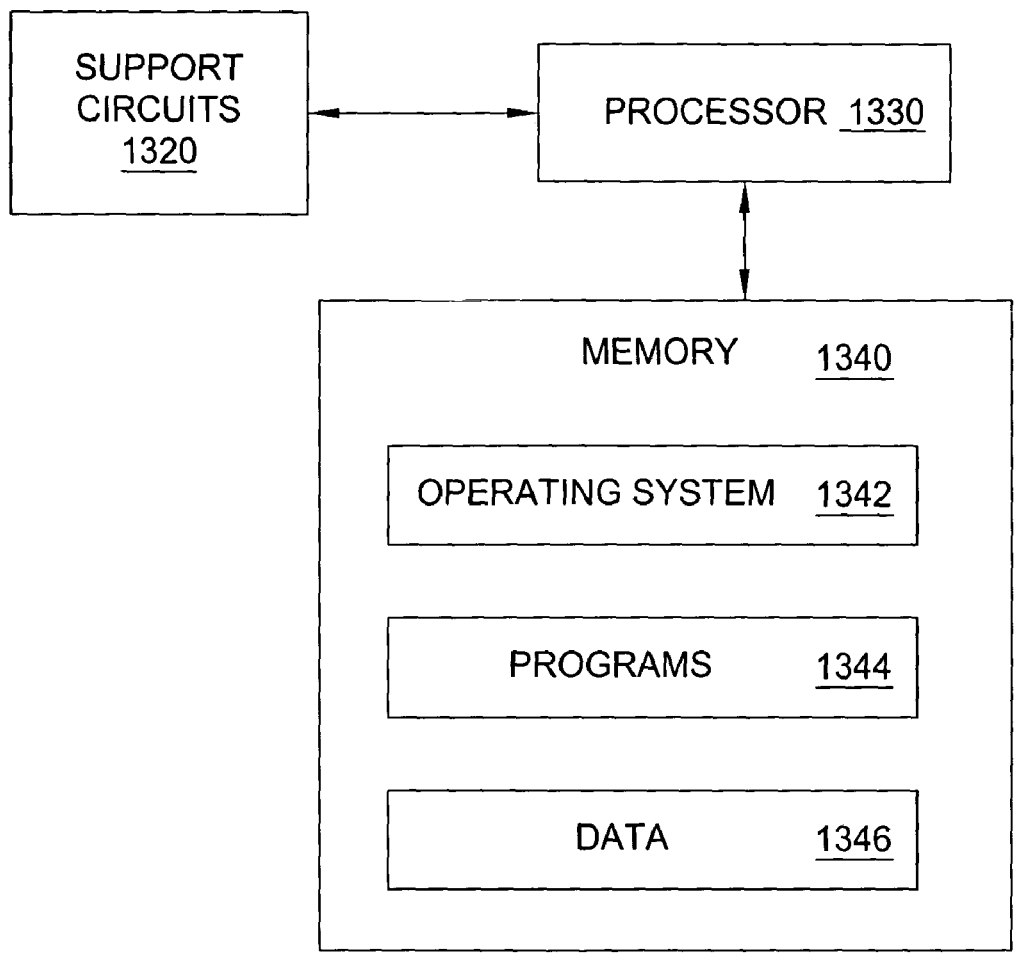
FIG. 13 is a high level block diagram showing a computer. To facilitate understanding, identical reference numerals have been used, where possible, to designate identical elements that are common to the figures.

FIG. 13 is a high level block diagram showing a computer. The computer 1300 may be employed to implement embodiments of the present invention. The computer 1300 comprises a processor 1330 as well as memory 1340 for storing various programs 1344 and data 1346. The memory 1340 may also store an operating system 1342 supporting the programs 1344.

The processor 1330 cooperates with conventional support circuitry such as power supplies, clock circuits, cache memory and the like as well as circuits that assist in executing the software routines stored in the memory 1340. As such, it is contemplated that some of the steps discussed herein as software methods may be implemented within hardware, for example, as circuitry that cooperates with the processor 1330 to perform various method steps. The computer 1300 also contains input/output (I/O) circuitry that forms an interface between the various functional elements communicating with the computer 1300.

Although the computer 1300 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for network monitoring, comprising:
   receiving by a device a topology of a network, a set of selected edges in the network, and a set of terminals in the network;
   determining a set of sourcerouted probes having a plurality of probe paths that originate and terminate from the set of terminal nodes, the sourcerouted probes crafted to emulate different network services, the probe paths covering the set of selected edges, while minimizing cost; and
   deploying the set of sourcerouted probes to measure an end-to-end service quality of a specific service being monitored.

2. The method of claim 1, wherein no sourcerouted probe in the set of sourcerouted probes exceeds a predetermined link capacity.

3. The method of claim 1, wherein a total cost of the set of sourcerouted probes is minimized.

4. The method of claim 1, wherein a maximum cost of each sourcerouted probe in the set of sourcerouted probes is minimized.

5. The method of claim 1, wherein a total number of source routed probes in the set of sourcerouted probes is minimized.

6. The method of claim 1, wherein the set of sourcerouted probes is deployed to monitor a voice over Internet protocol (VoIP) service.

7. A system for network monitoring, comprising:
   a processor including an operating system and at least one storage device; and
   a software component stored on a computer readable non-transitory medium, the software component when processed by a computer, adapt the operation of the computer to perform a method of network monitoring, including:
   receiving a topology of a network, a set of selected edges in the network, and a set of terminals in the network;
   determining a set of sourcerouted probes having a plurality of probe paths that originate and terminate from the set of terminal nodes, the sourcerouted probes crafted to emulate different network services, the probe paths covering the set of selected edges, while minimizing cost; and
   deploying the set of sourcerouted probes to measure an end-to-end service quality of a specific service being monitored.

8. The system of claim 7, wherein no sourcerouted probe in the set of sourcerouted probes exceeds a predetermined link capacity.

9. The system of claim 7, wherein a total cost of the set of sourcerouted probes is minimized.

10. The system of claim 7, wherein a maximum cost of each sourcerouted probe in the set of sourcerouted probes is minimized.

11. The system of claim 7, wherein a total number of sourcerouted probes in the set of sourcerouted probes is minimized.

12. The system of claim 7, wherein the set of sourcerouted probes is deployed to monitor a voice over Internet protocol (VoIP) service.

13. A non-transitory computer readable medium storing instructions which, when processed by a computer, adapt the operation of the computer to perform a method for network monitoring, the method comprising:
   receiving a topology of a network, a set of selected edges in the network, and a set of terminals in the network;
   determining a set of sourcerouted probes having a plurality of probe paths that originate and terminate from the set of terminal nodes, the sourcerouted probes crafted to emulate different network services, the probe paths covering the set of selected edges, while minimizing cost; and
   deploying the set of sourcerouted probes to measure an end-to-end service quality of a specific service being monitored.

14. The non-transitory computer readable medium of claim 13, wherein no sourcerouted probe in the set of sourcerouted probes exceeds a predetermined link capacity.

15. The non-transitory computer readable medium of claim 13, wherein a total cost of the set of sourcerouted probes is minimized.

16. The non-transitory computer readable medium of claim 13, wherein a maximum cost of each sourcerouted probe in the set of source routed probes is minimized.

17. The non-transitory computer readable medium of claim 13, wherein a total number of sourcerouted probes in the set of sourcerouted probes is minimized.

18. The non-transitory computer readable medium of claim 13, wherein the set of sourcerouted probes is deployed to monitor a voice over Internet protocol (VoIP) service.

* * * * *